United States Patent
Lee

(10) Patent No.: US 10,595,231 B2
(45) Date of Patent: Mar. 17, 2020

(54) ELECTRONIC DEVICE AND METHOD FOR CONTROLLING THE ELECTRONIC DEVICE FOR JOINT TRANSMISSION THEREOF

(71) Applicant: Samsung Electronics Co., Ltd., Suwon-si, Gyeonggi-do (KR)

(72) Inventor: Min-gyu Lee, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 87 days.

(21) Appl. No.: 16/013,392

(22) Filed: Jun. 20, 2018

(65) Prior Publication Data

US 2019/0174357 A1 Jun. 6, 2019

(30) Foreign Application Priority Data

Dec. 5, 2017 (KR) .................. 10-2017-0165647

(51) Int. Cl.
*H04W 28/16* (2009.01)
*H04W 88/08* (2009.01)
(Continued)

(52) U.S. Cl.
CPC ............ *H04W 28/16* (2013.01); *H04B 7/024* (2013.01); *H04B 7/0639* (2013.01); *H04B 7/0837* (2013.01); *H04L 1/0003* (2013.01); *H04W 88/08* (2013.01); *H04W 92/20* (2013.01); *H04W 74/0816* (2013.01)

(58) Field of Classification Search
CPC ...... H04W 28/16; H04W 88/08; H04W 92/20
See application file for complete search history.

(56) References Cited

U.S. PATENT DOCUMENTS 9,031,593 B2 5/2015 Liao
9,197,371 B2 11/2015 Davydov et al.
(Continued)

FOREIGN PATENT DOCUMENTS

KR 10-2016-0141816 A 12/2016
WO 2015/157039 A2 10/2015
(Continued)

OTHER PUBLICATIONS

International Search Report and Written Opinion dated Nov. 28, 2018; International Appln. No. PCT/KR2018/007212.
(Continued)

*Primary Examiner* — Gbemileke J Onamuti
(74) *Attorney, Agent, or Firm* — Jefferson IP Law, LLP

(57) ABSTRACT

A control method of an electronic device for performing joint transmission is provided. The control method includes searching for access points (APs) to retrieve a plurality of APs, determining a modulation and coding scheme (MCS) for data transmission based on a signal strength of at least two APs among the plurality of APs, determining the at least two APs as candidate APs for joint transmission by comparing a joint transmission gain time according to the determined MCS and a synchronization time for the at least two APs to perform joint transmission, transmitting information about the candidate APs to an AP control device, and performing data communication with joint APs, which are determined to perform joint transmission by the AP control device, among the candidate APs.

20 Claims, 20 Drawing Sheets

(51) Int. Cl.
  *H04W 92/20* (2009.01)
  *H04B 7/08* (2006.01)
  *H04B 7/06* (2006.01)
  *H04B 7/024* (2017.01)
  *H04L 1/00* (2006.01)
  *H04W 74/08* (2009.01)

(56) References Cited

U.S. PATENT DOCUMENTS

| | | |
|---|---|---|
| 9,326,230 B2 | 4/2016 | Homchaudhuri et al. |
| 9,351,277 B2 | 5/2016 | Davydov et al. |
| 2014/0362802 A1 | 12/2014 | Jitsukawa |
| 2015/0288427 A1 | 10/2015 | Wang et al. |
| 2015/0381328 A1 | 12/2015 | Mo et al. |

FOREIGN PATENT DOCUMENTS

| | | |
|---|---|---|
| WO | 2016/155776 A1 | 10/2016 |
| WO | 2016/187890 A1 | 12/2016 |

OTHER PUBLICATIONS

Sarah L. Stewart, The State of the Wi-Fi: a Look at Hotel Internet in 2015, May 14, 2015 [http://www.travelandleisure.com/articles/the-state-of-the-wi-fi-a-look-at-hotel-internet-in-2015] The State of the Wi-Fi: a Look at Hotel Internet in 2015 | Travel + Leisure.

Erik Sherman, Why are these luxury hotels still charging for Wi-Fi? May 3, 2015, Fortune [http://fortune.com/2015/05/03/luxury-hotels-wifi/] Signage for the W Hotel New York in Times Square. W Hotel is part of Starwood Hotels.

Tim Keller, Optimizing RF Signal Performance to Improve LTE Coverage and Capacity [http://www.antennasonline.com/main/articles/optimizing-rf-signal-performance-to-improve-lte-coverage-and-capacity/] Jun. 16, 2014 New HLIL2IR Mini L1/L2 GPS/GLONASS and Iridium Quadrifilar Helical Antenna Series.

ELECTRONIC DEVICE AND METHOD FOR CONTROLLING THE ELECTRONIC DEVICE FOR JOINT TRANSMISSION THEREOF

CROSS-REFERENCE TO RELATED APPLICATION(S)

This application is based on and claims priority under 35 U.S.C. § 119(a) of Korean patent application number 10-2017-0165647, filed on Dec. 5, 2017, in the Korean Intellectual Property Office, the disclosure of which is incorporated by reference herein in its entirety.

TECHNICAL FIELD

The disclosure relates to an electronic device and a control method. More particularly, the disclosure relates to an electronic device capable of performing data communication with a plurality of access points (APs) through joint transmission and a control method thereof.

BACKGROUND

With the development of communication technology, a wireless communication system which provides a high-speed data communication service with various multimedia services wirelessly has been used. In such a wireless communication system, the farther the distance between an access point (AP) and an electronic device, the lower the reception signal strength of the electronic device, and if a decoding fails due to a low reception signal strength, a network performance deteriorates as a huge amount of resource is consumed for retransmission.

To address the problem, an increased number of APs are used to remove the area in which data communication is not actively performed for the far distance to an AP. For example, such a place as a public place or a hotel uses a network environment in which one electronic device is positioned in a communication range of a plurality of APs. However, even if an electronic device is positioned in a communication range of a plurality of APs, the performance of data reception does not improve in proportion to the number of APs.

To overcome the limitation, a technique that a plurality of APs transmit data through joint transmission has been developed. The joint transmission is a technique that a plurality of APs transmit data to an electronic device simultaneously at the same time using a same frequency resource. By the joint transmission, the quality of reception signal of an electronic device and the rate of data transmission can improve greatly.

However, in the case of joint transmission, data transmission is performed based on a modulation and coding scheme (MCS) determined with reference to a signal strength received from a certain AP among a plurality of APs. Accordingly, there has been a limitation in improving a data transmission rate as communication is performed based on an MCS corresponding to a certain AP irrespective of an increased reception signal strength by joint transmission.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of selecting a modulation and coding scheme (MCS) adaptively based on a reception signal strength of a plurality of access points (APs) and performing data communication with the plurality of APs through joint transmission and a control method thereof.

In accordance with an aspect of the disclosure, a control method of an electronic device is provided. The method includes searching for access points (APs) to retrieve a plurality of APs, determining a modulation and coding scheme (MCS) for data transmission based on a signal strength of at least two APs among the plurality of APs, determining the at least two APs as candidate APs for joint transmission by comparing a joint transmission gain time according to the determined MCS and a synchronization time for the at least two APs to perform joint transmission, transmitting information about the candidate APs to an AP control device, and performing data communication with joint APs, which are determined to perform joint transmission by the AP control device, among the candidate APs.

The determining of the at least two APs as the candidate APs may include determining APs to which the electronic device is accessible among the plurality of APs, and determining the at least two APs as the candidate APs based on a signal strength among the APs to which the electronic device is accessible.

The determining of the at least two APs as the candidate APs may further include obtaining a time at which data is received from the at least two APs, and identifying the synchronization time for the at least two APs based on a difference in time at which the data is received.

The determining of the at least two APs as the candidate APs may further include determining the MCS based on a signal strength of the at least two APs, calculating a first data reception time at which a predetermined size of data is received based on the determined MCS, calculating the joint transmission gain time by calculating a difference between the first data reception time and a second data reception time at which the predetermined size of data is received from an AP having a strongest signal strength, and in response to the joint transmission gain time being greater than the synchronization time, determining the at least two APs as the candidate APs.

The method may further include, in response to the at least two APs being determined as the candidate APs, adding the at least two APs and a new AP, determining a new MCS for data transmission based on a signal strength of the at least two APs and the new AP, and determining the at least two APs and the new AP as candidate APs for joint transmission by comparing a joint transmission gain time and a synchronization time for the at least two APs and the new AP to perform joint transmission based on the new MCS.

The information about the candidate APs may include identification information related to at least one candidate AP set, synchronization time information of the at least one candidate AP set, and MCS information corresponding to the at least one candidate AP set.

One of the at least one candidate AP set may be determined as a joint AP by the AP control device based on a network situation.

The performing of the data communication may include receiving a request to send (RTS) packet including address information related to the joint APs and a duration calculated using an MCS corresponding to the joint APs from the joint APs, and in response to receiving the RTS packet, transmitting a clear to send (CTS) packet including a duration calculated using an MCS corresponding to a reception signal strength of the RTS packet to the joint APs.

The RTS packet may be transmitted from the joint APs simultaneously based on the synchronization time.

In accordance with another aspect of the disclosure, an electronic device which performs data communication with a plurality of access points (APs) through joint transmission is provided. The electronic device includes a communication interface, a processor configured to control the electronic device and be electrically connected with the communication interface, and a memory configured to store instructions that, when executed by the processor, cause the processor to search for APs to retrieve a plurality of APs, determine a modulation and coding scheme (MCS) for data transmission based on a signal strength of at least two APs among the plurality of APs, determine the at least two APs as candidate APs for joint transmission by comparing a joint transmission gain time according to the determined MCS and a synchronization time for the at least two APs to perform joint transmission, control the communication interface to transmit information about the candidate APs to an AP control device, and control the communication interface to perform data communication with joint APs which are determined to perform joint transmission by the AP control device among the candidate APs.

The processor may be further configured to determine APs to which the electronic device is accessible among the plurality of APs and to determine the at least two APs as the candidate APs based on a signal strength among the APs to which the electronic device is accessible.

The processor may be further configured to obtain a time at which the at least two APs receive data and to identify the synchronization time for the at least two APs based on a difference in time at which the data is received.

The processor may be further configured to determine an MCS based on a signal strength of the at least two APs, to calculate a first data reception time at which a predetermined size of data is received based on the determined MCS, to calculate the joint transmission gain time by calculating a difference between the first data reception time and a second data reception time at which the predetermined size of data is received from an AP having a strongest signal strength, and in response to the joint transmission gain time being greater than the synchronization time, to determine the at least two APs as the candidate APs.

The processor may be further configured to, in response to the at least two APs being determined as the candidate APs, add the at least two APs and a new AP, to determine a new MCS for data transmission based on a signal strength of the at least two APs and the new AP, and to determine the at least two APs and the new AP as candidate APs for joint transmission by comparing a joint transmission gain time and a synchronization time for the at least two APs and the new AP to perform joint transmission based on the new MCS.

The information about the candidate APs may include identification information related to at least one candidate AP set, synchronization time information of the at least one candidate AP set, and MCS information corresponding to the at least one candidate AP set.

One of the at least one candidate AP set may be determined as a joint AP by the AP control device based on a network situation.

The processor may be further configured to control the communication interface to receive a request to send (RTS) packet including address information related to the joint APs and a duration calculated using an MCS corresponding to the joint APs from the determined joint APs, and in response to receiving the RTS packet, control the communication interface to transmit a CTS packet including a duration calculated using an MCS corresponding to a reception signal strength of the RTS packet to the joint APs in response to the RTS packet.

The RTS packet may be transmitted from the joint APs simultaneously based on the synchronization time.

As described above, by performing data communication using an MCS determined based on a signal strength of a plurality of APs for joint transmission, a data reception performance of an electronic device may improve.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
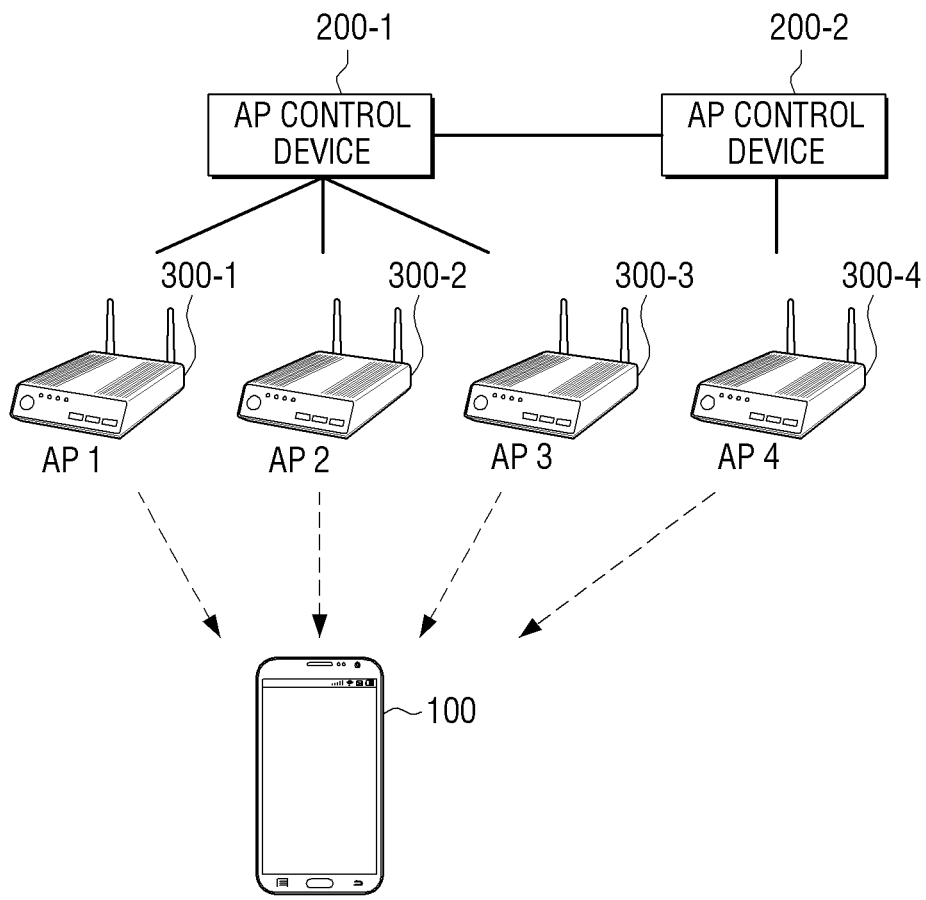
FIG. 1 is a diagram illustrating an example of a wireless communication system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms, "include," "comprise," "is configured to," etc. of the description are used to indicate the presence of features, numbers, operations, elements, parts or combination thereof, and do not exclude the possibilities of combination or addition of one or more features, numbers, operations, elements, parts or combination thereof.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

The terms including ordinal number such as "first," "second," and so on may be used in the description and the claims to distinguish the elements from one another. These terms are used only for the purpose of differentiating one component from another, without limitation thereto.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

In the description, the term "configured to" may be changed to, for example, "suitable for," "having the capacity to," "designed to," "adapted to," "made to," or "capable of" under certain circumstances. The term "device configured to" may not necessarily mean only "device specifically designed to" in a hardware sense. Instead, under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., central processing unit (CPU) or application processor) that can perform the corresponding operations through execution of one or more software programs stored in a memory device.

According to various example embodiments, the electronic device may be implemented as a device capable of performing data communication with an access point (AP). For example, the electronic device may include at least one of a smartphone, a tablet PC, a mobile phone, a video phone, an electronic book reader, a desktop, a laptop, a netbook computer, a workstation, a server, a personal digital assistant (PDA), a portable multimedia player (PMP), a Moving Picture Experts Group (MPEG-1 or MPEG-2) Audio Layer-3 (MP3) player, a medical device, a camera and a wearable device. The wearable device may include at least one of an accessary type (e.g., a watch, a ring, a bracelet, an ankle bracelet, a necklace, glasses, contact lenses, and a head-mounted device (HMD), etc.) circuit, an integral fabric or clothing (e.g., an electronic clothes, etc.) circuit, a body attachable (e.g., a skin pad, tattoo, etc.) circuit, and a bio-implantable circuit. In some example embodiments, the electronic device may include at least one of, for example, a television, a digital video disk (DVD) player, an audio, a refrigerator, an air conditioner, a vacuum cleaner, an oven, a microwave, a washing machine, an air purifier, a set-top box, a home automation control panel, a security control panel, a media box (e.g., Samsung HomeSync™, Apple TV™ or google TV™, etc.), a game consol, (e.g., Xbox™, PlayStation™, etc.), an electronic dictionary, an electronic key, a camcorder, and an electronic picture frame.

According to other example embodiments, the electronic device may include at least one of various medical devices (e.g., various portable medical measuring device such as a blood sugar measuring device, a heart rate measuring device, a blood pressure measuring device, a body temperature measuring device, etc.), a magnetic resonance angiography (MRA), a magnetic resonance imaging (MRI), a computed tomography (CT), an imaging device, an ultrasonic device, etc.), a navigation device, a global navigation satellite system (GNSS), an event data recorder (EDR), a flight data recorder (FDR), a vehicle infotainment device, an electronic device for ship (e.g., a navigation device for ship, a gyro compass, etc.), an avionics, a security device, a head unit for vehicle, an industrial or home robot, a drone, an automated teller machine (ATM) of financial institutions, a point of sales (POS) of a store, and an Internet of Things (e.g., a light bulb, various sensors, a sprinkler device, a fire alarm, a temperature adjusting device, a streetlight, a toaster, an exercise equipment, a hot water tank, a heater, a boiler, etc.).

Hereinafter, various example embodiments will be described in greater detail with reference to the accompanying drawings.

FIG. 1 is a diagram illustrating an example of a wireless communication system in according to an embodiment of the disclosure.

Referring to FIG. 1, a wireless communication system 10 may include an electronic device 100, a plurality of AP control devices 200-1 and 200-2 and a plurality of APs 300-1, 300-2, 300-3 and 300-4. There may be the plurality of AP control devices 200-1 and 200-2, but the number of AP control devices are not limited thereto. There may be one AP control device, and one of the plurality of APs may perform a function of the AP control device.

The electronic device 100 may search for the plurality of APs 300-1, 300-2, 300-3 and 300-4. For example, when the plurality of APs 300-1, 300-2, 300-3 and 300-4 broadcasts a beacon message, the electronic device 100 may search for the plurality of APs 300-1, 300-2, 300-3 and 300-4 based on the beacon message received from the plurality of APs 300-1, 300-2, 300-3 and 300-4.

The electronic device 100 may receive an input of a user command for performing joint transmission data communication through at least two APs among the plurality of APs 300-1, 300-2, 300-3 and 300-4. For example, the electronic device 100 may receive an input of a user command for performing joint transmission data communication through a UI screen displayed on the electronic device 100.

The electronic device 100 may determine at least two candidate APs among the plurality of APs 300-1, 300-2, 300-3 and 300-4 to perform joint transmission data communication. The electronic device 100 may determine a candidate AP to which the electronic device is accessible and which has a gain by joint transmission.

For example, the electronic device 100 may identify an AP to which the electronic device 100 is accessible. As an example, the electronic device 100 may determine an AP provided by a same telecommunication company as a telecommunication company of the electronic device 100, an AP which has a history of pairing with the electronic device 100 before, a common AP, etc. as an AP accessible by the electronic device 100. In other words, the electronic device 100 may determine an AP provided by another telecommunication company, an AP which does not have a history of pairing with the electronic device 100 and needs a registration of password, etc., as an inaccessible AP. However, the electronic device 100 may determine APs of a plurality of telecommunication companies as an accessible AP through a certain service provider.

The electronic device 100 may determine a modulation and coding scheme (MCS) for data transmission based on a signal strength of at least two APs among a plurality of accessible APs, compare a transmission gain time according to the determined MCS and a synchronization time for the at least two APs to perform joint transmission and determine the at least two APs, which have a gain through joint transmission, as candidate APs for joint transmission. The electronic device 100 may determine at least one candidate AP set by repeating the above operation.

The electronic device 100 may transmit the information about the determined candidate APs (or a plurality of candidate AP sets) to AP control device 200-1, which is external to the electronic device 100. The information about the candidate APs may include at least one of identification information related to at least one candidate AP set, synchronization time information of the at least one candidate AP set, and MCS information corresponding to the at least one candidate AP set.

The AP control device 200-1 may determine at least one candidate AP set as a joint AP based on a network situation. For example, the AP control device 200-1 may determine the candidate AP set having a maximum gain among the at least one candidate AP set as a joint AP. However, the AP control device 200-1 may finally determine a joint AP based on a network situation (e.g., the number of external electronic devices accessed to a candidate AP). Also, the AP control device 200-1 may identify the MCS in which a rate of processing a reception signal strength in the electronic device 100 becomes the maximum. The AP control device 200-1 may determine a joint AP by negotiation with another AP control device 200-2.

If the AP control device 200-1 determines joint APs, the AP control device 200-1 may command the APs determined as the joint APs to transmit data to the electronic device 100. The AP control device 200-1 may command the APs to transmit data to the electronic device 100 based on a synchronization time information of the AP set determined as the joint APs, the MCS information, etc.

The electronic device 100 may receive data from the at least two APs determined as the joint APs among the plurality of APs 300-1, 300-2, 300-3 and 300-4 and perform joint transmission data communication.

Figure 2:
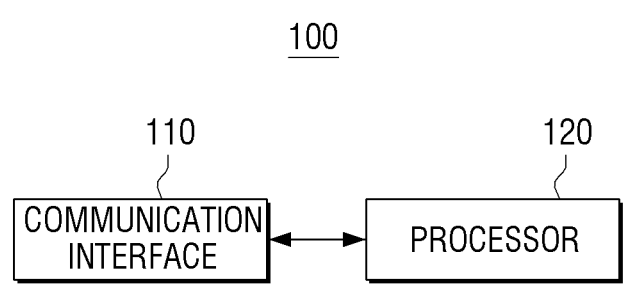
FIGS. 2 and 3 are block diagrams illustrating an example configuration of an electronic device according to an embodiment of the disclosure.

FIG. 2 is a block diagram illustrating an example configuration of an electronic device according to an embodiment of the disclosure.

Referring to FIG. 2, the electronic device 100 may include a communication interface 110 and a processor 120. The elements illustrated in FIG. 2 are merely examples, and appropriate hardware/software elements may be further included in the electronic device 100.

The communication interface 110 may communicate with an external AP, and in this case, the communication interface 110 may be implemented as a Wi-Fi chip. In other words, the Wi-Fi chip of the communication interface 110 may search for APs through a beacon message received from the external AP, and perform data communication with at least one AP among retrieved APs. Also, the Wi-Fi chip may transmit and receive various connection information, such as a service set identifier (SSID), a session key, etc., first, perform communication connection using the information, and transmit and receive various information. The example embodiment in which the communication interface 110 is implemented as Wi-Fi chip is merely one example, and the communication interface 110 may be implemented as another communication chip (e.g., 3rd generation (3G), 3rd generation partnership project (3GPP), long term evolution (LTE), etc.

The communication interface 110 may perform data communication through joint transmission with a plurality of external APs. In other words, the communication interface 110 may receive data from a plurality of synchronized external APs.

The processor 120 may be connected with the communication interface 110 and control overall operations of the electronic device 100. The processor 120 may search for a plurality of APs through the communication interface 110, determine an MCS for data transmission based on at least two APs among the plurality of retrieved APs, determine the at least two APs as candidate APs for joint transmission by comparing a joint transmission gain time according to the determined MCS and a synchronization time for the at least two APs to perform joint transmission, control the communication interface 110 to transmit the information about the determined candidate APs to the AP control device 200, and perform data communication with the joint APs determined to perform joint communication by the AP control device among the determined candidate APs.

For example, the processor 120 may determine APs to which the electronic device is accessible among the plurality of APs and determine the at least two APs among the APs to which the electronic device is accessible based on a signal strength. In other words, the processor 120 may determine at least two APs having the strongest signal strength among the APs to which the electronic device 100 is accessible.

The processor 120 may obtain the time at which the electronic device receives data from the at least two APs, and identify a synchronization time for the at least two APs based on a difference in time at which the data is received. In other words, as the data reception start time needs to be the same for joint transmission, the processor 120 may identify the synchronization time for the at least two APs.

The processor 120 may determine an MCS based on a signal strength of the at least two APs, calculate the first data reception time at which a predetermined size of data is received based on the determined MCS, and calculate the joint transmission gain time by calculating a difference between the first data reception time and the second data reception time at which the predetermined size of data is received from an AP having a strongest signal strength, and if the joint transmission gain time is greater than the synchronization time, the processor 120 may determine the at least two APs as candidate APs.

If the at least two APs are determined as candidate APs, the processor 120 may add the at least two APs and a new AP, determine a new MCS for data transmission based on a signal strength of the at least two APs and the new AP, compare a joint transmission gain time according to the new MCS and a synchronization time for the at least two APs and the new AP to perform joint transmission, and determine the at least two APs and the new AP as candidate APs for joint transmission. In other words, if data communication is performed through joint transmission with respect to a plurality of AP sets, the processor 120 may identify a plurality of candidate AP sets by identifying whether there is a gain.

The electronic device 100 may control the communication interface 110 to transmit the information about the at least one determined candidate AP set to an external AP. The information about the at least one determined candidate AP set may include at least one of identification information related to at least one candidate AP set, synchronization time information of the at least one candidate AP set, and MCS information corresponding to the at least one candidate AP set.

If one of the at least one candidate AP set is determined as a joint AP by the AP control device based on a network situation, the processor 120 may perform data communication with the determined joint APs. For example, the processor 120 may receive a request to send (RTS) packet including address information related to the joint APs and a duration calculated using an MCS corresponding to the joint APs from the determined joint APs, and control the communication interface 110 to transmit a clear to send (CTS) packet including a duration calculated using an MCS corresponding to a reception signal strength of the RTS packet to the joint APs in response to the RTS packet. The RTS packet may be transmitted from the joint APs simultaneously based on a synchronization time.

Figure 3:
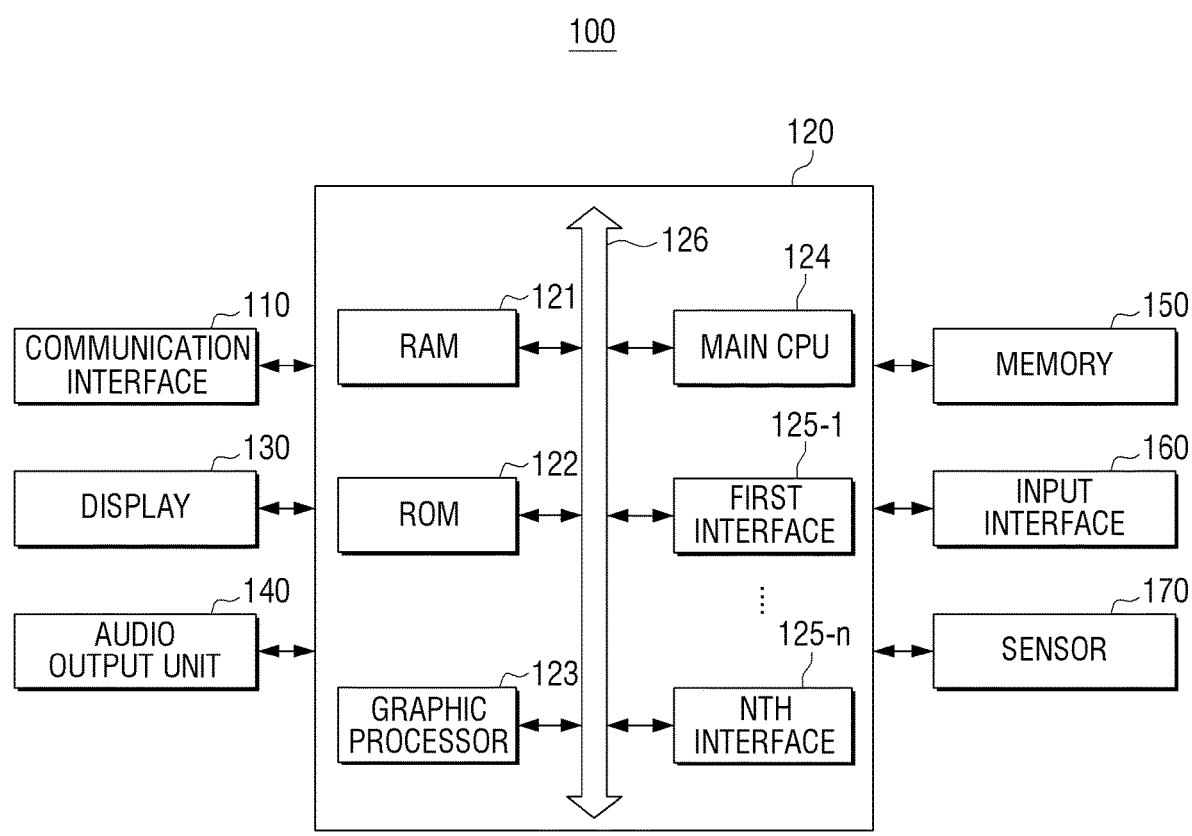

FIG. 3 is a block diagram illustrating an example configuration of an electronic device according to an embodiment of the disclosure.

Referring to FIG. 3, the electronic device 100 may include the communication interface 110, a display 130, an audio output unit 140, a memory 150, an input interface 160, a sensor 170, and the processor 120. The descriptions for the elements in FIG. 3 which overlap with the elements illustrated in FIG. 2 will not be repeated.

The display may provide various screens. The display 130 may display a UI for performing data communication through joint transmission. The display 130 may be implemented as various forms of displays such as a liquid crystal display (LCD), an organic light emitting diode (OLED), a plasma display panel (PDP), etc. The display may further include a driving circuit which may be implemented in a form such as an a-si TFT, low temperature poly silicon (LTPS), a TFT, an organic TFT (OTFT), etc., a backlight unit, etc. The display 130 may be combined with a touch panel and be implemented as a touch screen.

The audio output unit 140 may output not only various audio data on which various processing operations are performed such as decoding, amplifying, noise-filtering, etc. by an audio processor (not illustrated) but also various alarm sounds or a voice message. The audio output unit 140 may be implemented as a speaker, but is not limited hereto. The audio output unit may be implemented as an output terminal capable of outputting audio data. The audio output unit 140 may also output a message relating to whether data communication through joint transmission can be performed.

The memory 150 may store a command or data related to at least one other element of the electronic device 100. The memory 150 may be implemented as a non-volatile memory, a volatile memory, a flash memory, a hard disk drive (HDD), a solid state drive (SSD), etc. The memory may be accessed by the processor 120, and the reading/recording/editing/deleting/updating of data may be performed by the processor 120. The term 'memory' in the example embodiment may include the memory 150, a read only memory (ROM) and a random access memory (RAM) provided in the processor 120, or a memory card (not illustrated) provided in the electronic device 100 (e.g., a micro secure digital (SD) card, a memory stick, etc.). The memory 150 may store various programs and data for performing joint transmission data communication.

The input interface 160 may receive various user inputs and transfer the inputs to the processor 120. The input interface 160 may include a touch sensor, a (digital) pen sensor, a pressure sensor, a key, or a microphone. The touch sensor may use at least one of, for example, a capacitive method, a pressure sensitive method, an infrared method, and an ultrasonic wave method. The (digital) pen sensor may be, for example, a part of a touch panel or include a separate recognition sheet. The key may include, for example, a physical button, an optical key, or a keypad. The microphone may receive a user voice, and be provided in the electronic device 100, but the example embodiments are not limited to the above example. The microphone may be provided on the outside of the electronic device 100 and be electrically connected with the electronic device 100. The input interface 160 may also receive an input of a user command for performing joint transmission data communication.

The sensor 170 may obtain various information about the state of the electronic device 100. For example, the sensor 170 may include a geomagnetic sensor, a gyro sensor, an accelerator sensor, a proximity sensor, etc., and obtain the information about various states of the electronic device 100, such as a rotation state, a movement direction, position information, etc.

The processor 120 may be configured with a RAM 121, a ROM 122, a graphic processor 123, a main CPU 124, a first to nth interfaces 125-1 to 125-*n,* and a bus 126. The RAM 121, the ROM 122, the graphic processor 123, the main CPU 124, and the first to nth interfaces 125-1 to 125-*n* may be connected with one another via the bus 126.

Figure 4:
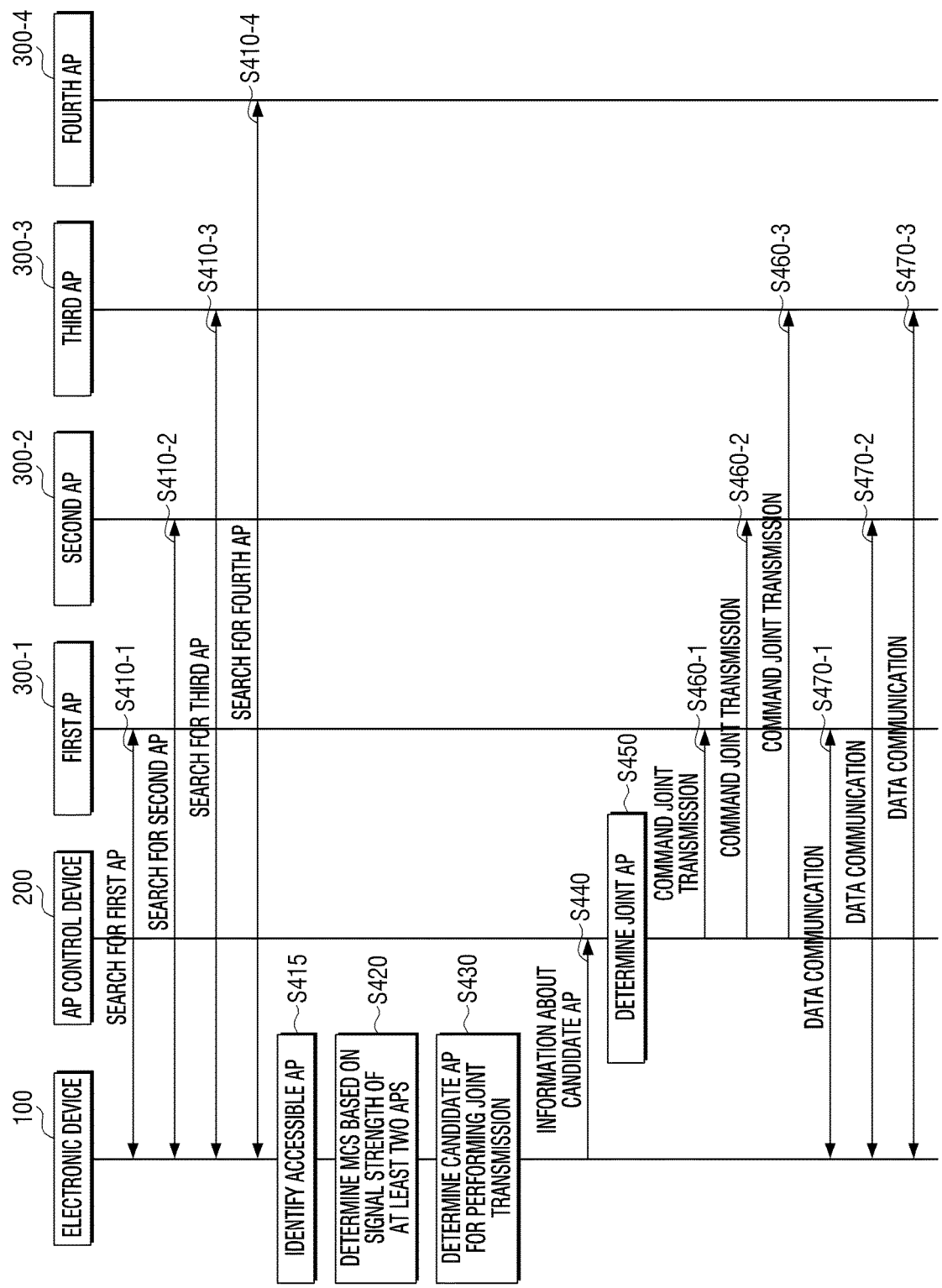
FIG. 4 is a flowchart illustrating an example method for performing joint transmission of a wireless communication system according to an embodiment of the disclosure.

FIG. 4 is a flowchart illustrating an example method for performing joint transmission in a wireless communication system according to an embodiment of the disclosure.

Referring to FIG. 4, the electronic device 100 may search for the plurality of APs 300-1, 300-2, 300-3 and 300-4. For example, the electronic device 100 may search for the plurality of APs 300-1, 300-2, 300-3 and 300-4 through AP search messages S410-1, S410-2, S410-3 and S410-4 received from the plurality of APs 300-1, 300-2, 300-3 and 300-4. When searching for the APs, the electronic device 100 may obtain the information (e.g., identification information, signal strength information, telecommunication company information, etc.) on the plurality of APs 300-1, 300-2, 300-3 and 300-4 through the AP search messages such as a beacon message or an access network query protocol (ANQP) message.

The electronic device 100 may identify an accessible AP among the plurality of APs 300-1, 300-2, 300-3 and 300-4, at operation S415. For example, the electronic device 100 may identify whether an AP is accessible based on the information of the AP included in the AP search message. The electronic device 100 may determine an AP which has a history of performing a pairing with the electronic device 100 before, a common AP, an AP provided by a certain telecommunication company, etc. as an accessible AP. In other words, the electronic device 100 may determine an AP which does not have a history of performing a pairing before, an AP which needs a password registration, or an AP provided by another telecommunication company as an inaccessible AP. The electronic device 100 may determine APs of a plurality of telecommunication companies as accessible APs through a certain service provider.

The electronic device 100 may determine an MCS based on a signal strength of at least two APs among the plurality of APs 300-1, 300-2, 300-3 and 300-4, at operation S420. For example, the electronic device 100 may determine an MCS corresponding to the sum of a signal strength of at least two APs. As an example, if the sum of a signal strength of at least two APs is equal to or greater than a predetermined first threshold value and is lower than a second threshold value, the electronic device 100 may determine the first MCS. If the sum of a signal strength of at least two APs is equal to or greater than the second threshold value and is lower than the third threshold value, the electronic device 100 may determine the second MCS.

The greater the sum of a signal strength of at least two AP signals, the higher the MCS that is determined by the electronic device 100. As an example, the electronic device 100 may determine the first MCS based on the sum of a signal strength of a first AP 300-1 and a second AP 300-2 among the plurality of APs 300-1, 300-2, 300-3 and 300-4. Also, the electronic device 100 may determine the second MCS which is higher than the first MCS based on the sum of a signal strength of the first AP 300-1 to a third AP 300-3 (APs 300-1, 300-2 and 300-3) among the plurality of APs 300-1, 300-2, 300-3 and 300-4. The electronic device 100 may also determine the third MCS higher than the first MCS and the second MCS based on a signal strength of the plurality of APs 300-1, 300-2, 300-3 and 300-4.

The electronic device 100 may determine a candidate AP for performing joint transmission, at operation S430. For example, the electronic device 100 may compare a joint transmission gain time according to the determined MCS and a synchronization time for at least two APs to perform joint transmission and determine at least two APs as candidate APs for joint transmission.

The above operation will be described in greater detail with reference to FIGS. 5, 6A, 6B, 7A, 7B, 8A, and 8B.

Figure 5:
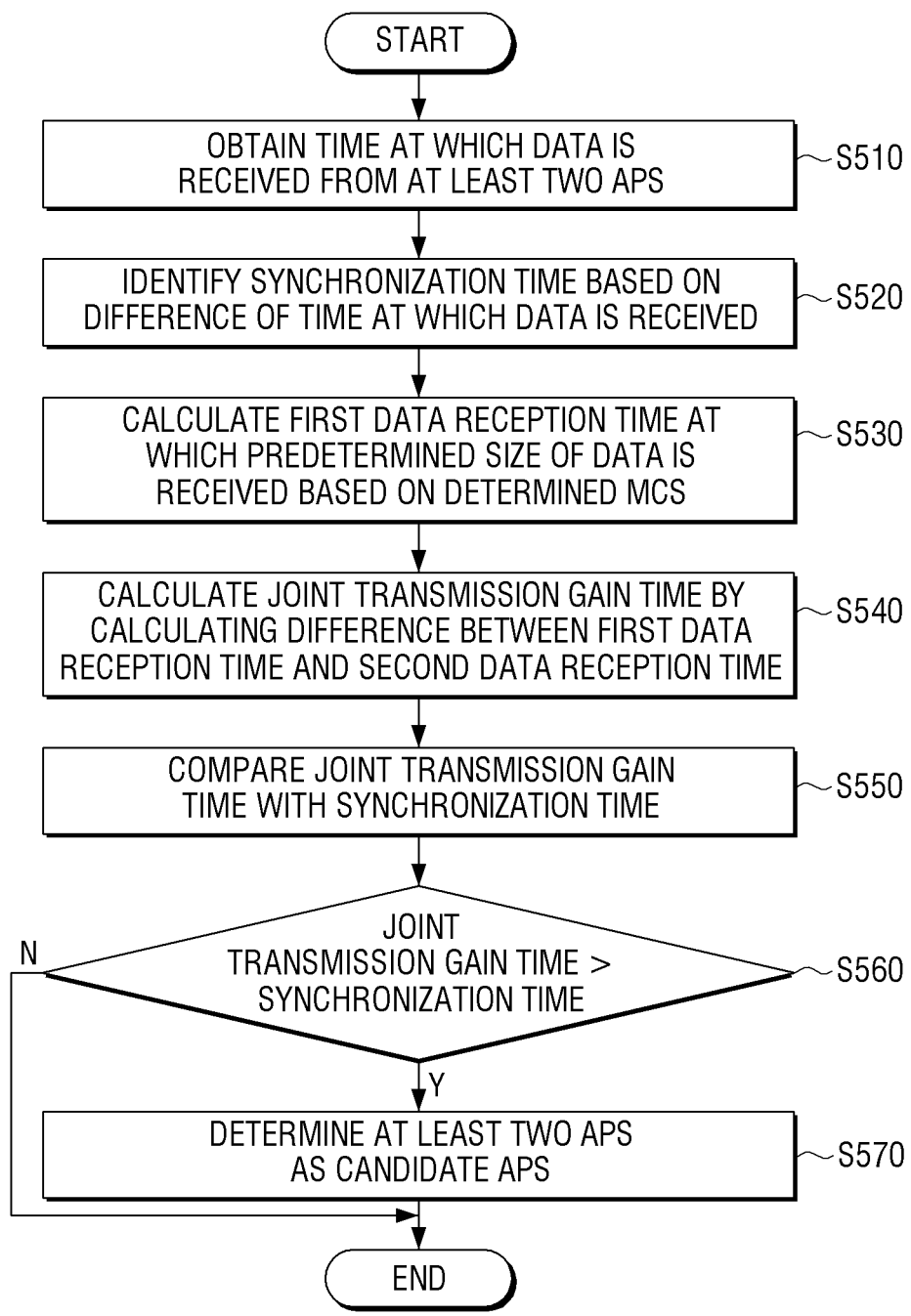
FIG. 5 is a flowchart illustrating an example method of an electronic device for determining a candidate AP according to an embodiment of the disclosure.

FIG. 5 is a flowchart illustrating an example method of an electronic device for determining a candidate AP according to an embodiment of the disclosure.

Referring to FIG. 5, the electronic device 100 may obtain the time at which data is received from the at least two APs, at operation S510. If there is a reference time (e.g., a GPS time), the electronic device 100 may analyze a difference between the reference time included in a signal which the APs transmit and a reception time of a signal which the APs transmit, and obtain the time at which the data transmitted by the at least two APs is received. If there is no reference time, the electronic device 100 may obtain the time at which the data transmitted by the at least two APs is received by analyzing a round trip time (RTT).

The electronic device 100 may determine a synchronization time based on a difference in time at which data is received, at operation S520. For example, the electronic device 100 may calculate the difference between the time at which the data transmitted from the first AP among the at least two APs is received and the time at which the data transmitted from the second AP among the at least two APs is received, and determine a synchronization time. In other words, if the data transmitted from the at least two APs are received at different times, the AP with a shorter data reception time among the at least two APs may need a time for synchronization to synchronize the data transmitted by the at least two APs. Thus, the electronic device 100 may determine a synchronization time by the same method described above. If there are three or more APs, the electronic device 100 may determine a synchronization time for each AP with reference to the AP with the longest data reception time.

The electronic device 100 may calculate the first data reception time at which a predetermined size of data is received based on the determined MCS, at operation S530. In other words, if data is transmitted from the at least two APs through joint transmission based on the determined MCS, the electronic device 100 may calculate the first data reception time at which the predetermined data is received.

The electronic device 100 may calculate the difference between the first data reception time and the second data reception time and calculate a joint transmission gain time, at operation S540. The second data reception time may be the time at which a predetermined size of data is received from the AP having the strongest signal strength (or the AP having the shortest signal reception time).

In other words, the electronic device 100 may calculate a joint transmission gain time which is a gain obtained by joint transmission, by calculating the difference between the first data reception time at which data is received through joint transmission from the at least two APs and the second data reception time at which data is received from the AP having the strongest signal strength without joint transmission.

The electronic device 100 may compare the joint transmission gain time and the synchronization time, at operation S550. The electronic device 100 may determine whether the joint transmission gain time is greater than the synchronization time, at operation S560. If the joint transmission gain time is greater than the synchronization time (S560—Y), the electronic device 100 may determine the at least two APs as candidate APs, at operation S570. In other words, if there is a gain for the at least two APs through joint transmission, the electronic device 100 may determine the at least two APs as candidate APs for performing joint transmission. If the joint transmission gain time is equal to or smaller than the synchronization time (S560—N), the electronic device 100 may not determine the at least two APs as candidate APs.

The electronic device 100 may apply the operation illustrated in FIG. 5 to a plurality of AP sets and determine at least one candidate AP set. The method for determining at least one candidate AP set will be described in greater detail with reference to FIGS. 6A, 6B, 7A, 7B, 8A, and 8B.

FIGS. 6A, 6B, 7A, 7B, 8A, and 8B are diagrams illustrating an example method for determining a candidate AP which performs joint transmission in a wireless communication system according to an embodiment of the disclosure.

Referring to FIGS. 6A, 6B, 7A, 7B, 8A, and 8B, the plurality of APs 300-1, 300-2, 300-3 and 300-4 may have a stronger signal strength in order. In other words, the first AP 3001 may have the strongest signal strength and a fourth AP 300-4 may have the weakest signal strength.

Figure 6A:
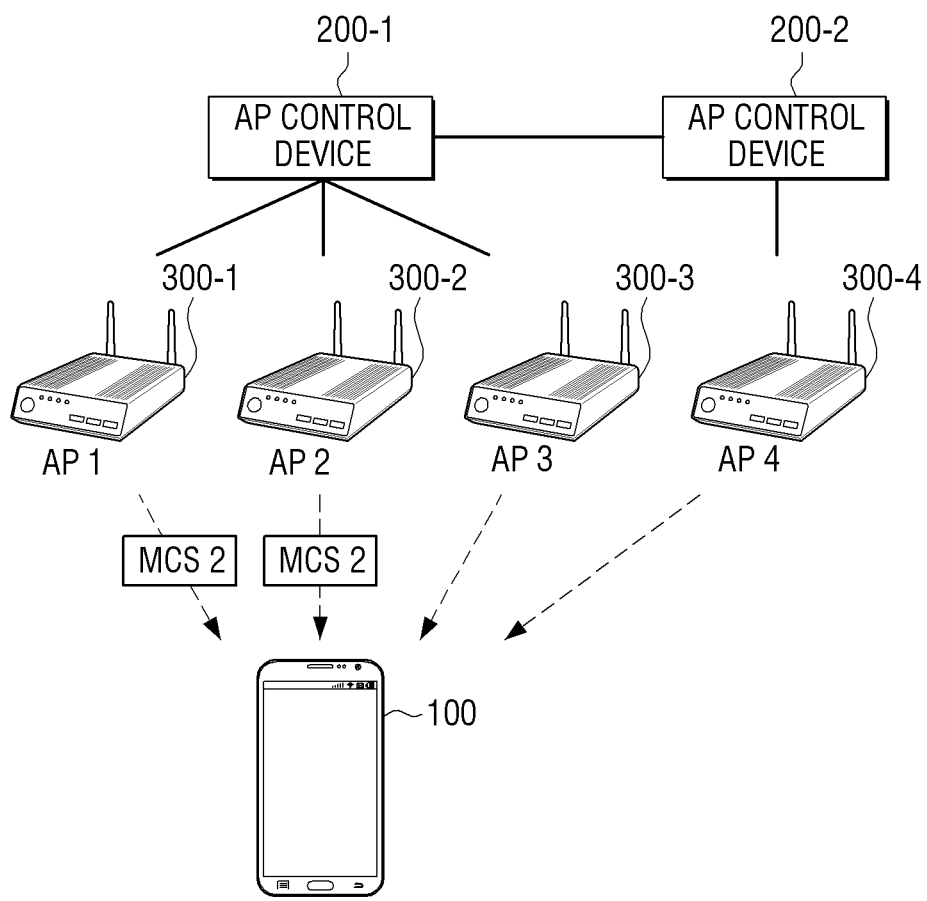
FIGS. 6A, 6B, 7A, 7B, 8A, and 8B are diagrams illustrating an example method for determining a candidate access point (AP) which performs joint transmission in a wireless communication system according to an embodiment of the disclosure.

Referring to FIG. 6A, if the at least two APs are the first AP 300-1 and the second AP 300-2, the electronic device 100 may determine an MCS for joint transmission as a second MCS based on the sum of signal strengths of the first AP 300-1 and the second AP 300-2. The second MCS may be higher than the first MCS for the first AP 300-1 to transmit data.

Figure 6B:
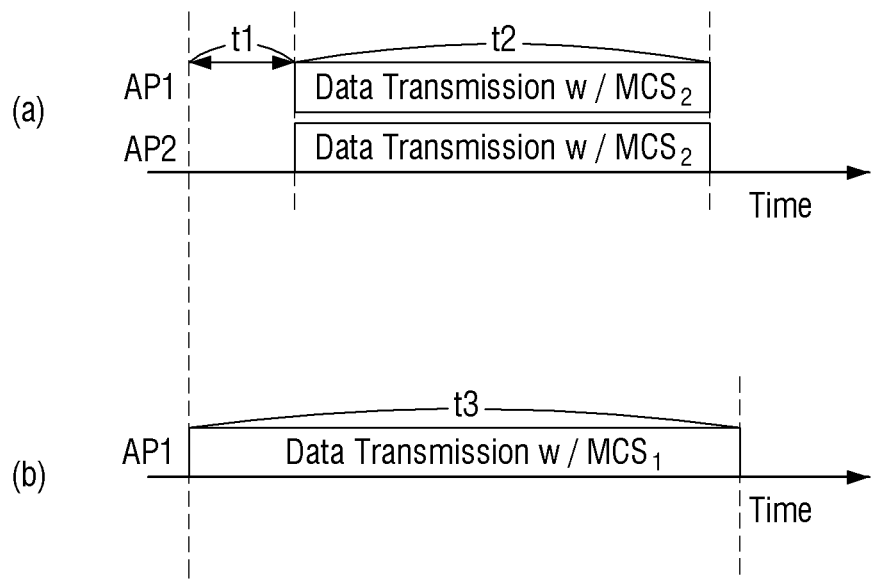

Referring to FIG. 6B, the electronic device 100 may calculate a synchronization time t1 of the first AP 300-1 and the second AP 300-2. In other words, the electronic device 100 may calculate the synchronization time t1 based on a difference between the time at which a signal is received from the first AP 300-1 and the time at which a signal is received from the second AP 300-2.

The electronic device 100 may acquire a first data reception time t2 at which a predetermined size of data is received from the first AP 300-1 and the second AP 300-2 based on the determined second MCS.

The electronic device 100 may obtain a second data reception time t3 at which a predetermined size of data is received from the first AP 300-1 based on the first MCS.

The electronic device 100 may calculate a joint transmission gain time t3−t2 by calculating a difference between the first data reception time t2 and the second data reception time t3. If the joint transmission gain time t3−t2 is greater than the synchronization time t1, the electronic device 100 may determine the first AP 300-1 and the second AP 300-2 as a first candidate AP set.

In other words, if the time t1+t2 at which data is received through joint transmission illustrated in FIG. 6B(a) is shorter than the time t3 at which data is received from the AP which has the strongest signal strength as illustrated in FIG. 6B(b), the electronic device 100 may receive data more quickly through joint transmission, and thus, the first AP 300-1 and the second AP 300-2 may be determined as the first candidate AP set.

As described above, if the first AP 300-1 and the second AP 300-2 are determined as the first candidate AP set, the electronic device may add the third AP 300-3 having the next higher signal strength and determine whether to determine the first AP 300-1, the second AP 300-2 and the third AP 300-3 as a candidate AP set.

Figure 7A:
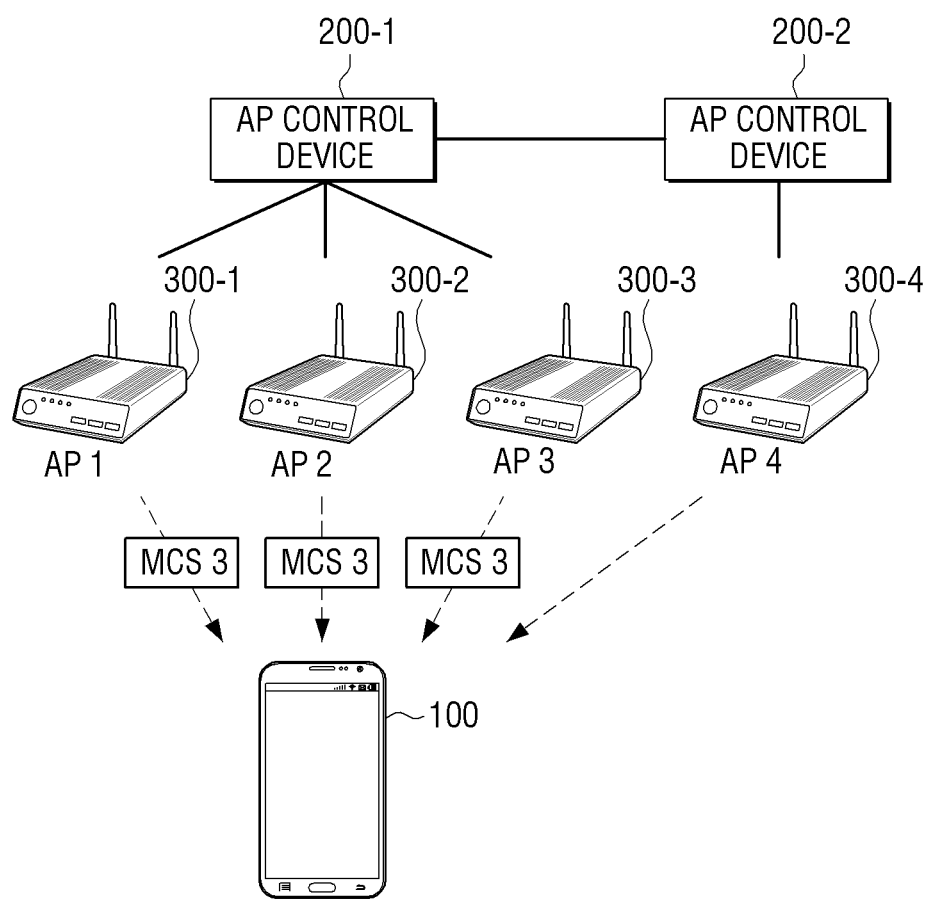

Referring to FIG. 7A, if the at least two APs are the first AP 300-1, the second AP 300-2, and the third AP 300-3, the electronic device 100 may determine an MCS for joint transmission as the third MCS based on the sum of signal strengths of the first AP 300-1, the second AP 300-2, and the third AP 300-3. The third MCS may be higher than the first MCS and the second MCS illustrated in FIG. 6A.

Figure 7B:
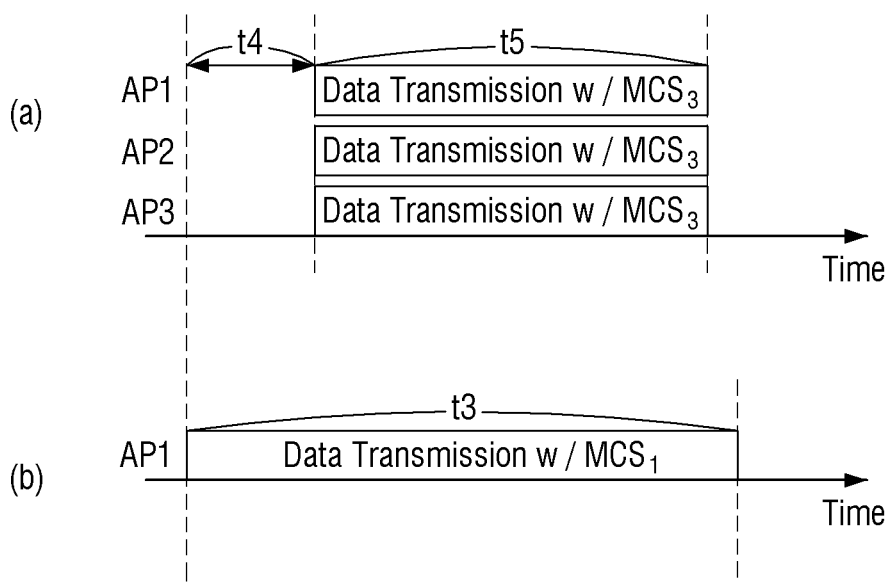

Referring to FIG. 7B, the electronic device 100 may calculate a synchronization time t4 of the first AP 300-1, the second AP 300-2, and the third AP 300-3. The electronic device 100 may calculate a synchronization time t4 based on the difference between the first AP 300-1 which has the shortest signal reception time and the third AP 300-3 which has the longest signal reception time.

The electronic device 100 may obtain the third data reception time t5 at which a predetermined size of data is received from the first AP 300-1, the second AP 300-2 and the third AP 300-3 based on the determined third MCS.

The electronic device 100 may obtain the second data reception time t3 at which a predetermined size of data is received from the first AP 300-1 based on the first MCS.

The electronic device 100 may calculate a joint transmission gain time t3−t5 by calculating a difference between the third data reception time t5 and the second data reception time t3. If the joint transmission gain time t3−t5 is greater than the synchronization time t4, the electronic device 100 may determine the first AP 300-1, the second AP 300-2 and the third AP 300-3 as a second candidate AP set.

In other words, if the time t4+t5 at which data is received through joint transmission illustrated in FIG. 7B(a) is shorter than the time t3 at which data is received from the AP which has the strongest signal strength as illustrated in FIG. 7B(b), the electronic device 100 may receive data more quickly through joint transmission, and thus, the first AP 300-1, the second AP 300-2 and the third AP 300-3 may be determined as the second candidate AP set.

As described above, if the first AP 300-1, the second AP 300-2 and the third AP 300-3 are determined as the second candidate AP set, the electronic device 100 may add the fourth AP 300-4 having the next higher signal strength and identify whether to determine the first AP 300-1, the second AP 300-2, the third AP 300-3 and the fourth AP 300-4 as a candidate AP set.

Figure 8A:
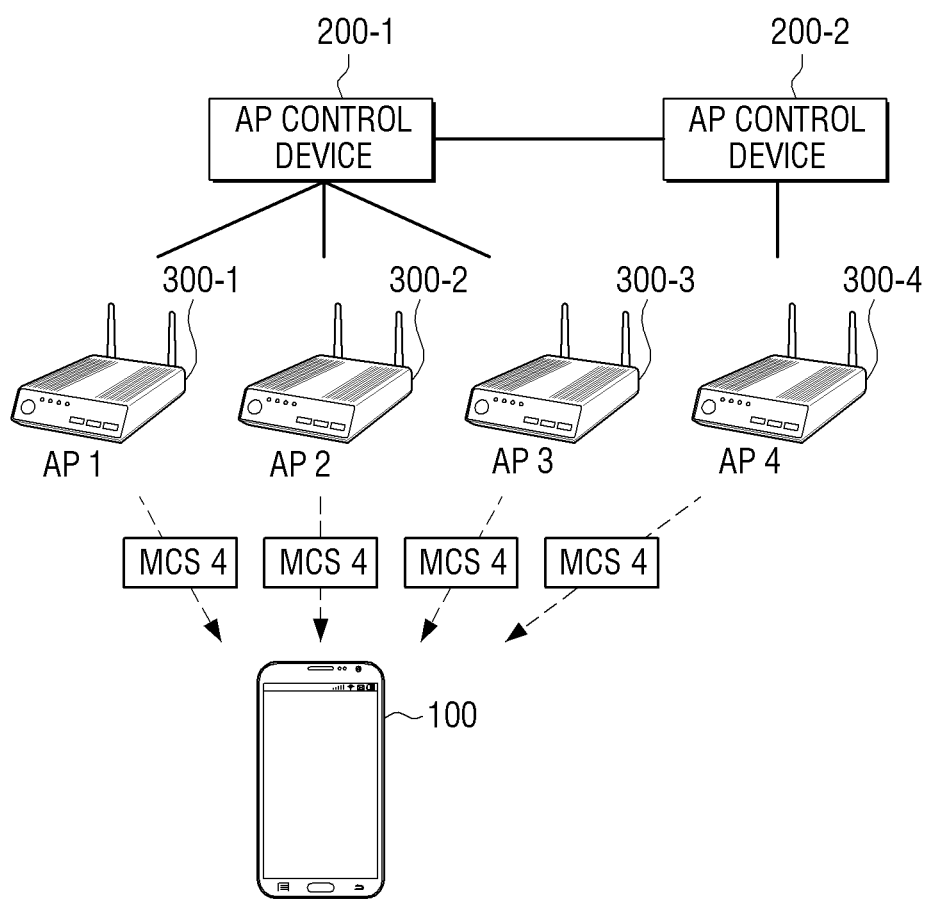

Referring to FIG. 8A, if the at least two APs are the first AP 300-1, the second AP 300-2, the third AP 300-3, and the fourth AP 300-4, the electronic device 100 may determine an MCS for joint transmission as a fourth MCS based on the sum of signal strengths of the first AP 300-1, the second AP 300-2, the third AP 300-3, and the fourth AP 300-4. The fourth MCS may be equal to or higher than the third MCS illustrated in FIG. 7A.

Figure 8B:
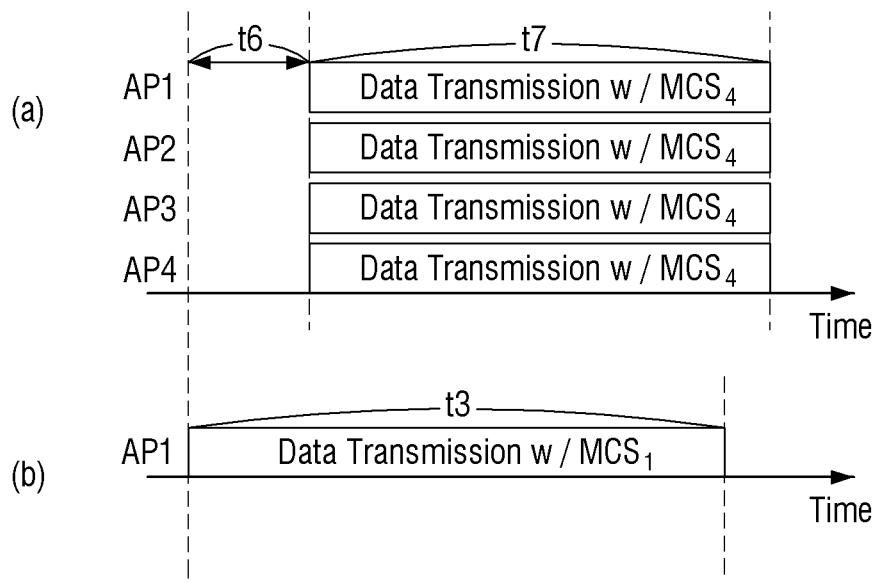

Referring to FIG. 8B, the electronic device 100 may calculate a synchronization time t6 of the first AP 300-1, the second AP 300-2, the third AP 300-3, and the fourth AP 300-4. In other words, the electronic device 100 may calculate a synchronization time t6 based on a difference between the time at which a signal is received from the first AP 300-1 having the shortest signal reception time and the time at which a signal is received from the fourth AP 300-4 having the longest signal reception time.

The electronic device 100 may obtain a fourth data reception time t7 at which a predetermined size of data is received from the first AP 300-1, the second AP 300-2, the third AP 300-3, and the fourth AP 300-4 based on the determined fourth MCS.

The electronic device 100 may obtain the second data reception time t3 at which a predetermined size of data is received from the first AP 300-1 based on the first MCS.

The electronic device 100 may calculate a joint transmission gain time t3−t7 by calculating a difference between the fourth data reception time t7 and the second data reception time t3. If the joint transmission gain time t3−t7 is smaller than the synchronization time t6, the electronic device 100 may not determine the first AP 300-1, the second AP 300-2, the third AP 300-3, and the fourth AP 300-4 as a candidate AP set.

In other words, if the time t6+t7 at which data is received through joint transmission illustrated in FIG. 8B(a) is longer than the time t3 at which data is received from the AP which has the strongest signal strength as illustrated in FIG. 8B(b), the reception of data through joint transmission may not be a gain for the electronic device 100 (that is, data may be received more slowly by joint transmission), and thus, the first AP 300-1, the second AP 300-2, the third AP 300-3, and the fourth AP 300-4 may not be determined as a candidate AP set.

The electronic device 100 may determine the first candidate AP set and the second candidate AP set as candidate AP sets for performing joint transmission by the method described above.

Referring back to FIG. 4, the electronic device 100 may transmit the information about the candidate APs to an AP control device 200, at operation S440. The information about the candidate APs may include at least one of the identification information related to at least one candidate AP set, the synchronization time information of at least one candidate AP set, and the MCS information corresponding to at least one candidate AP set.

The AP control device 200 may determine a joint AP for performing joint transmission, at operation S450. In other words, the AP control device 200 may determine one of the at least one candidate AP set included in the information about the candidate APs as a joint AP set based on a current network situation. The AP control device 200 may determine a candidate AP set having a maximum gain (that is, a candidate AP set which receives data most quickly) as a joint AP set. However, the AP control device 200 may determine a next ranking candidate AP set as a joint AP set based on a network situation such as the number of terminals accessed to an AP. According to an example embodiment, the AP control device 200 may determine the second candidate AP set including the first AP 300-1, the second AP 300-2, and the third AP 300-3 as a joint AP set.

The AP control device 200 may transmit a joint transmission command for performing joint transmission to joint APs. In other words, the AP control device 200 may transmit a joint transmission command to the first AP 300-1, the second AP 300-2, and the third AP 300-3, which are determined to perform joint transmission, at operations S460-1, S460-2, and S460-3, respectively. The joint transmission command may include the information about the second AP candidate set (e.g., the identification information of the APs included in the second AP candidate set, the MCS information, and the synchronization information, etc.) which is determined as a joint AP.

The first AP 300-1, the second AP 300-2 and the third AP 300-3, which are determined as joint APs, may perform data communication through joint transmission with the electronic device 100, at operations S470-1, S470-2, and S470-3, respectively.

In the below description, an example method for performing data communication between an AP and the electronic device 100 will be described with reference to FIGS. 9, 10, and 11A to 11C.

Before performing data communication, the electronic device 100 may exchange the information for performing joint transmission by exchanging a message with joint APs.

For example, the joint APs may transmit an RTS packet including the information for performing joint transmission to the electronic device 100 to occupy a channel.

Figure 9:
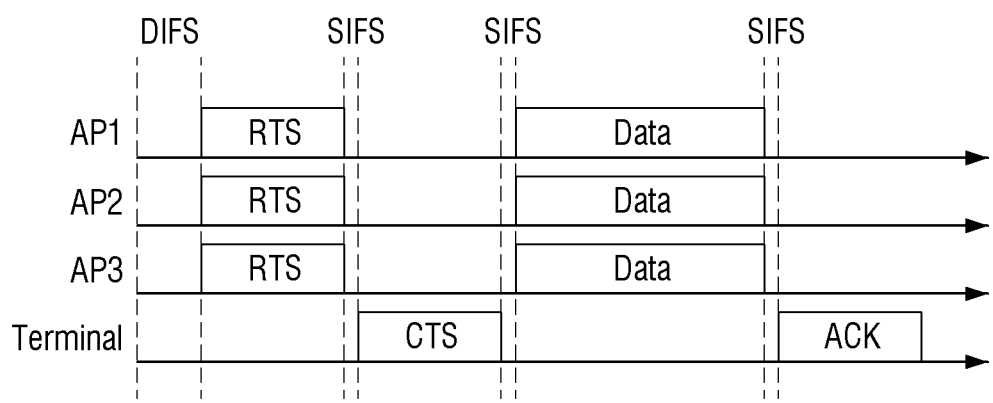
FIGS. 9 and 10 are diagrams illustrating an example data transmission method based on joint transmission according to an embodiment of the disclosure.
Figure 10:
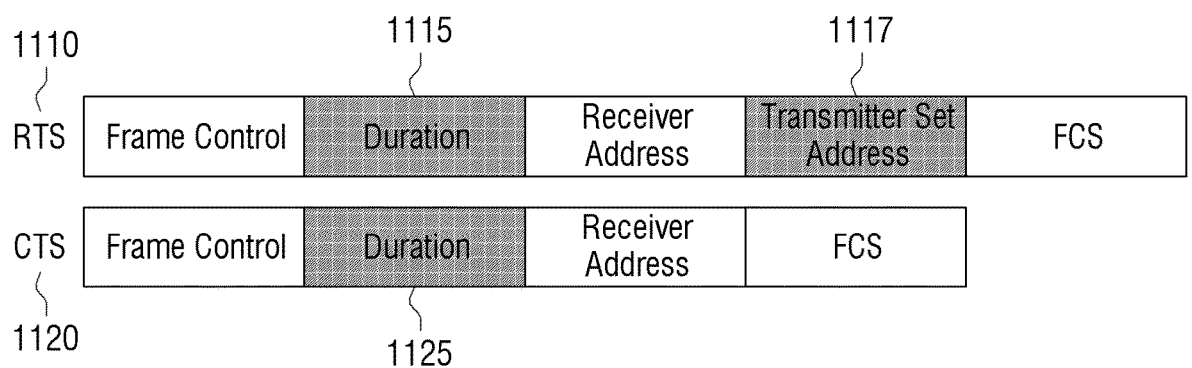

FIGS. 9 and 10 are diagrams illustrating an example data transmission method based on joint transmission according to an embodiment of the disclosure.

Referring to FIG. 9, the joint APs may transmit an RTS packet simultaneously based on synchronization information received from the AP control device 200.

Referring to FIG. 10, an RTS packet 1110 may include a duration 1115, which is calculated as an MCS corresponding to the joint APs, and a transmitter set address 1117 including address information related to the joint APs.

The electronic device 100 may transmit a CTS packet 1120 including a duration 1125 calculated as an MCS corresponding to a reception signal strength of the RTS packet 1110 in response to the RTS packet 1110. If there is no gain in joint transmission, the electronic device 100 may not transmit the CTS packet.

After exchanging the RTS packet and the CTS packet, the electronic device 100 may perform data communication through joint transmission with the joint APs. If the expected reception signal strength, which depends on the number of joint APs, becomes different, a detection threshold may need to be changed with respect to the MCS which uses an amplitude. For example, if the signals received from a plurality of joint APs are accumulated, an amplitude may increase and it may be easy to detect the symbol, but it may not be possible to use an original detection threshold as the overall reception signal strengths increase.

Figure 11A:
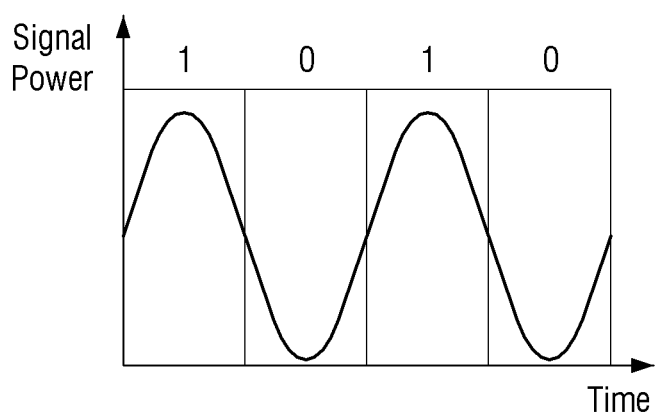
FIGS. 11A, 11B and 11C are graphs showing an example method for setting a dynamic detection threshold value to perform joint transmission according to an embodiment of the disclosure.
Figure 11B:
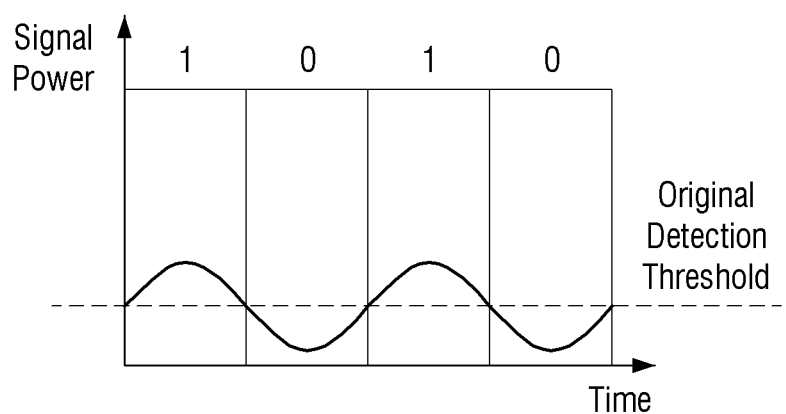
Figure 11C:
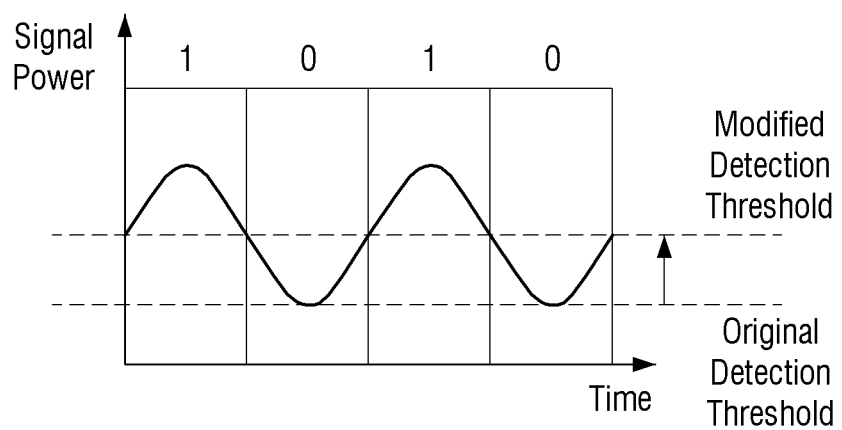

FIGS. 11A to 11C are graphs showing an example method for setting a dynamic detection threshold value to perform joint transmission according to an embodiment of the disclosure.

Referring to FIGS. 11A to 11C, as an example, if an original signal having the wave, as illustrated in FIG. 11A, is transmitted, and the original signal is received from a single AP, the electronic device 100 may detect a wave as illustrated in FIG. 11B. If an original signal is received from each of the plurality of joint APs, the electronic device 100 may detect a wave as illustrated in FIG. 11C. In other words, if an original signal is received from each of the plurality of joint APs, the electronic device 100 may not detect a symbol of an original signal by using an original detection threshold.

Thus, if a signal is received from each of a plurality of joint APs, the electronic device 100 may modify the detection threshold to correspond to a reception strength of a signal received from the plurality of joint APs based on the original detection threshold, and may detect a symbol of the signal using the modified detection threshold. The electronic device 100 may modify the detection threshold in proportion to the signal strength expected when a signal is received from the plurality of joint APs. For example, the modified detection threshold may be obtained by Equation 1 as below.

$$\text{Modified Detection Threshold} = \left( \frac{\text{Signal Strength Expected When Receiving Signal from Plurality of } APs}{\text{Signal Strength Expected When Receiving Signal from Single } AP} \right) \times \text{Original Detection Threshold} \quad \text{Equation 1}$$

Figure 12:
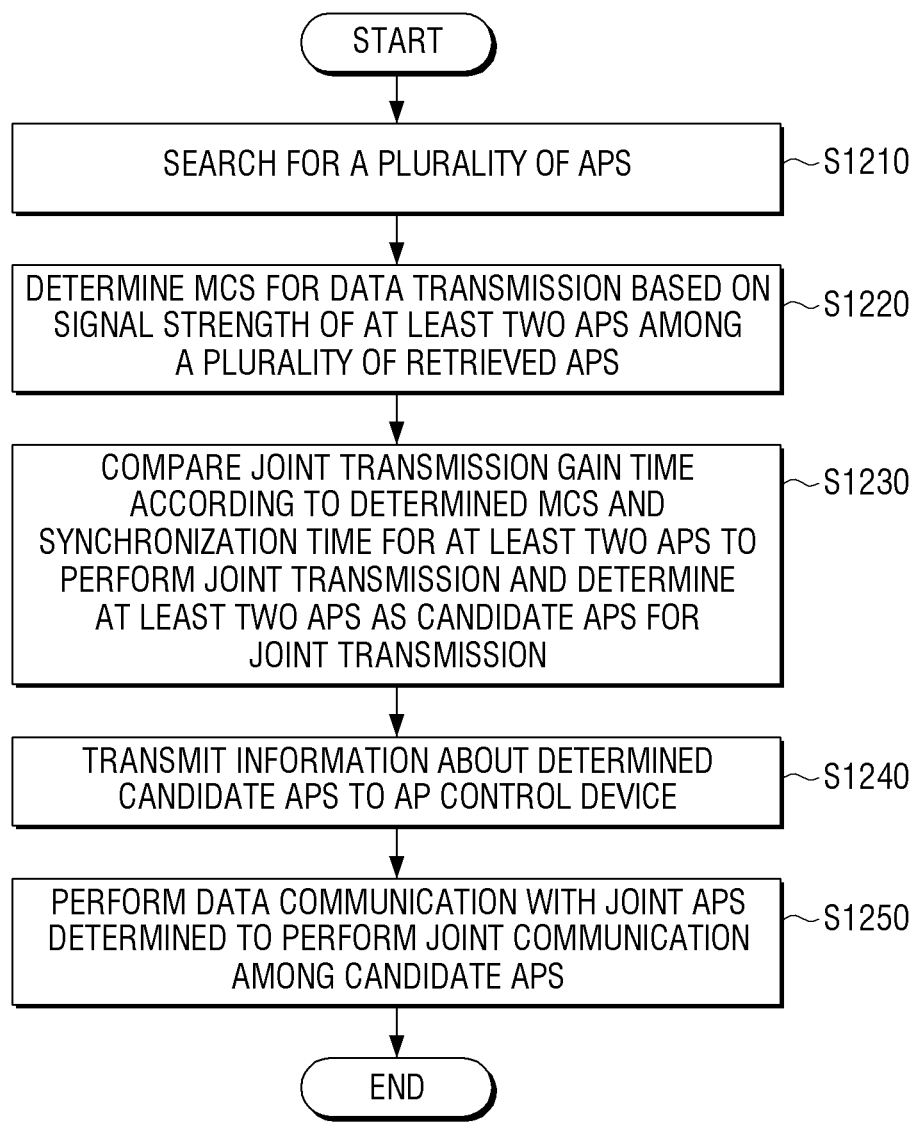
FIG. 12 is a flowchart illustrating an example method of an electronic device for performing joint transmission according to an embodiment of the disclosure.

FIG. 12 is a flowchart illustrating an example method of an electronic device for performing joint transmission according to an embodiment of the disclosure.

Referring to FIG. 12, the electronic device 100 may search for a plurality of APs, at operation S1210. For example, the electronic device 100 may search for a plurality of APs through an AP search message transmitted from the plurality of APs.

The electronic device 100 may determine an MCS for data transmission based on a signal strength of at least two APs among the plurality of retrieved APs, at operation S1220. In other words, the electronic device 100 may determine an MCS corresponding to the sum of a signal strength of at least two APs among the plurality of retrieved APs.

The electronic device 100 may compare a joint transmission gain time according to the determined MCS and a synchronization time for the at least two APs to perform joint transmission and determine the at least two APs as candidate APs for joint transmission, at operation S1230. In other words, if the joint transmission time is greater than the synchronization time, the electronic device 100 may determine that the at least two APs have a gain by joint transmission and determine the at least two APs as candidate APs.

The electronic device 100 may transmit the information about the determined candidate APs to the AP control device

200, at operation S1240. The information may include the identification information related to the determined candidate APs, the synchronization time information of candidate APs, and the MCS information for performing communication with candidate APs, etc.

The electronic device 100 may perform data communication with the joint APs which are determined to perform joint communication among the candidate APs, at operation S1250. For example, if the joint AP is determined from among the candidate APs (or a candidate AP set) by the AP control device 200, the electronic device 100 may perform data communication through joint transmission with the determined joint APs.

As described above, a data reception performance of an electronic device may be improved by performing data communication using an MCS determined based on a signal strength of a plurality of APs for joint transmission.

Figure 13:
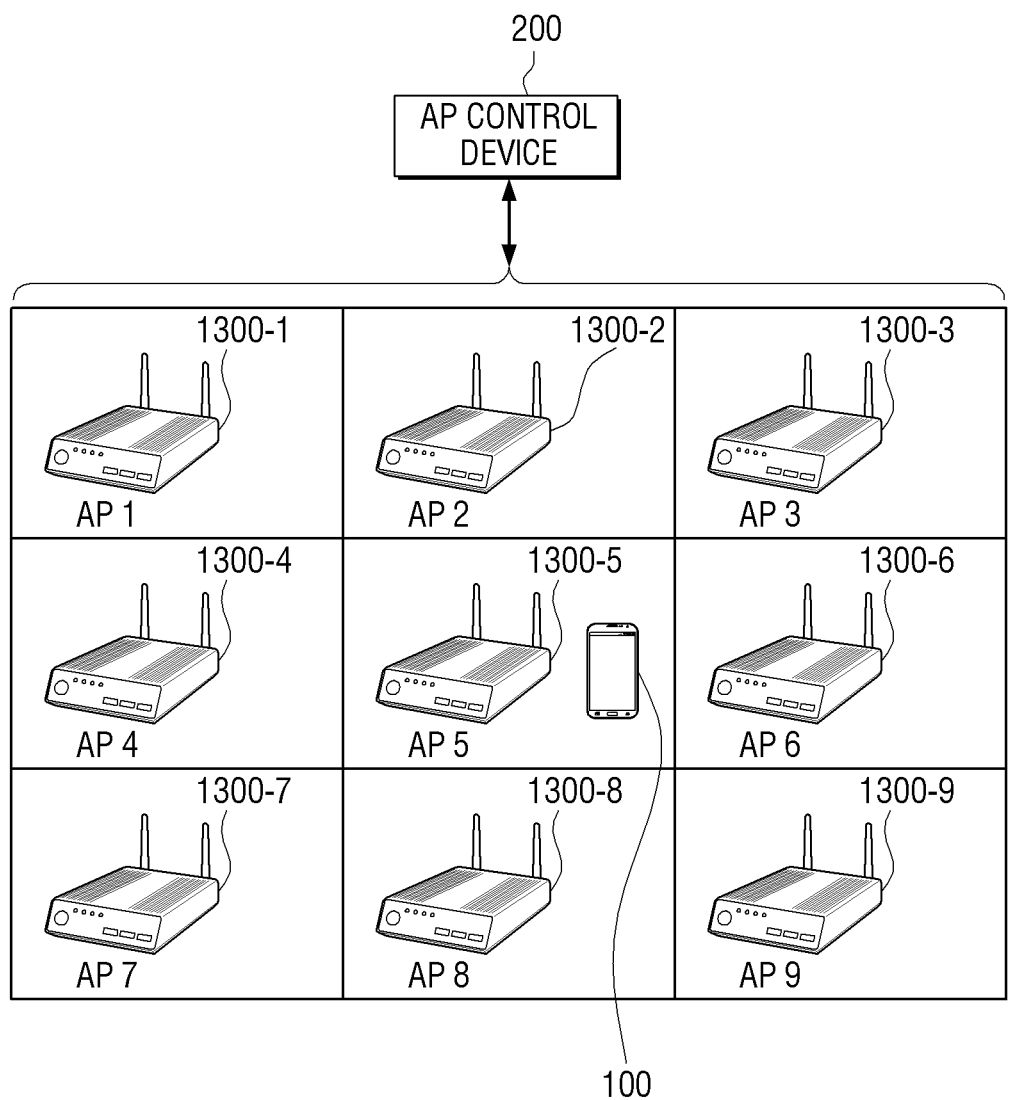
FIGS. 13, 14 and 15 are diagrams illustrating example embodiments of performing data communication through joint transmission according to various embodiments of the disclosure.
Figure 14:
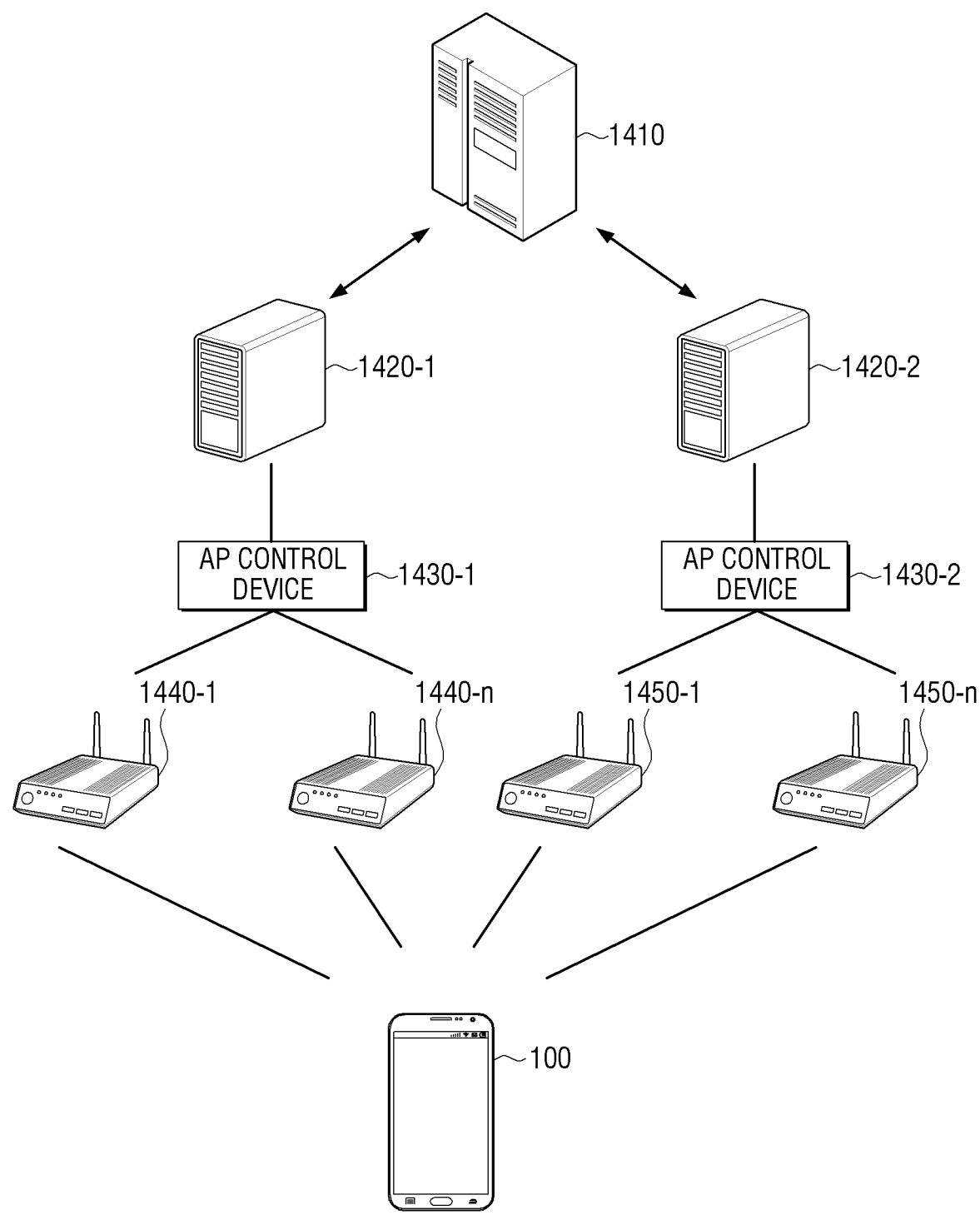
Figure 15:
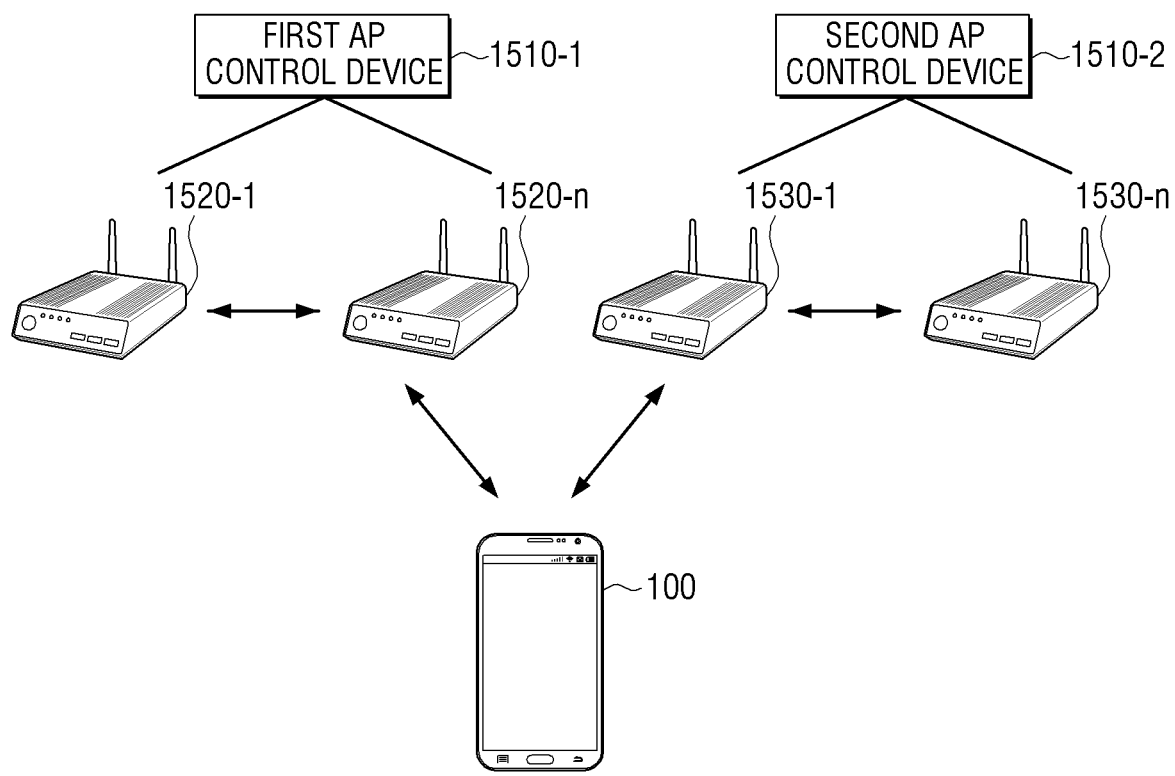

FIGS. 13, 14, and 15 illustrate various example embodiments of data communication using joint transmission according to various embodiments of the disclosure.

Referring to FIG. 13, a diagram is provided illustrating an embodiment of performing data communication through joint transmission using an AP positioned in each of a plurality of rooms in the hotel in accordance with an example embodiment.

The hotel may have an AP in each of a plurality of rooms or in each of a plurality of areas. For example, as illustrated in FIG. 13, the hotel may have first to ninth APs (first AP 1300-1, second AP 1300-2, third AP 1300-3, fourth AP 1300-4, fifth AP 1300-5, sixth AP 1300-6, seventh AP 1300-7, eighth AP 1300-8, and ninth AP 1300-9) in each of nine rooms.

When a user command for performing data communication for joint transmission is input in the electronic device 100 in Room 5, the electronic device 100 may determine at least two candidate AP sets from the first to ninth APs 1300-1 to 1300-9 by going through the process described in FIGS. 4 and 5. The electronic device 100 may transmit the information about the at least two candidate AP sets to the AP control device provided in the hotel. The information about a candidate AP set may include the information on a synchronization time corresponding to the candidate AP set and MCS information.

The AP control device provided in the hotel may determine joint APs by considering a current network situation from among at least two candidate AP sets. For example, the AP control device 200 may determine the final joint APs by excluding the AP in the room in which a guest stays, the AP which is accessed to a plurality of another electronic devices, etc. from the joint APs.

The AP control device may transmit to the finally determined joint APs a data communication command through joint transmission, and the joint APs and the electronic device 100 may perform data communication through joint transmission.

Accordingly, the hotel may provide a data communication service of higher speed using the APs provided in each hotel room by the method described above.

Referring to FIG. 14, a diagram is provided illustrating an embodiment in which data communication through joint transmission is performed using a plurality of APs irrespective of a type of an operator (or a type of a telecommunication company).

According to the embodiment of FIG. 14, an integrated server 1410, which manages a plurality of operator servers 1420-1 and 1420-2 in an integrated manner, may be included. The integrated server 1410 may issue to the electronic device 100 an access authority which allows access to the APs managed by the plurality of operator servers 1420-1 and 1420-2. The integrated server 1410 may exchange Wi-Fi accessible authority information with each of the plurality of operator servers 1420-1 and 1420-2. Each of the plurality of operator servers 1420-1 and 1420-2 may exchange the information about the access authority with each of a plurality of AP control devices 1430-1 and 1430-2 managed by the plurality of operator servers 1420-1 and 1420-2.

The electronic device 100 may perform data communication through joint transmission with the APs 1440-1 to 1440-*n* and 1450-1 to 1450-*n* managed by the plurality of AP control devices 1430-1 and 1430-2 based on the information about the authority firstly issued from the integrated server 1410.

In other words, the electronic device 100 may be provided with a data communication service through joint transmission by a plurality of APs regardless of a type of an operator using the authority issued from the integrated server 1410.

Referring to FIG. 15, a diagram is provided illustrating an embodiment of performing data communication through joint transmission using a plurality of APs provided by a plurality of operators.

Each of the plurality of operators may manage a plurality of APs in a public place. For example, the telecommunication companies may manage a plurality of APs in a public place (e.g., a subway, a bus terminal, etc.).

The electronic device 100 may be provided with a data communication server through joint transmission by a plurality of APs provided by a plurality of operators. For example, there may be a first AP control device 1510-1 and a plurality of APs 1520-1 to 1520-*n* which are provided by the first operator, and a second AP control device 1510-2 and a plurality of APs 1530-1 to 1530-*n* which are provided by the second operator in the public place.

If the electronic device 100 is registered in the first operator, the electronic device 100 may be provided with a data communication service through joint transmission by AP 1520-*n* provided by the first operator and AP 1530-*n* provided by the second operator. The information on an access authority may be exchanged between the first operator and the second operator, and the electronic device 100 may have all the authority to access the APs provided by the first operator and the APs provided by the second operator.

The electronic device 100 may be provided with a data communication service through joint transmission by the APs provided by not only the first operator but also the second operator, and may not use some of the APs provided by the first operator depending on a network situation.

The one or more embodiments may be implemented as software including an instruction stored in a machine-readable storage media. The machine may call the stored instruction from the storage media and operate according to the called instruction, and the machine may include an electronic device (e.g., the electronic device 100) described in the embodiments. If the instruction is executed by the processor, the processor may perform a function corresponding to the instruction using another element under control of the processor. The instruction may include a code generated and executed by a complier or an interpreter. The machine-readable storage media may be provided in a form of a non-transitory storage media. The term 'non-transitory' may simply indicate that the storage media does not include a signal and is tangible, not indicating whether data is stored semi-permanently or temporarily.

According to an example embodiment, the method described in the embodiments will be included in a computer program product and be provided. The computer program product may be traded between a seller and a buyer. The computer program product may be distributed in a form of a storage media (e.g., a compact disc read only memory (CD-ROM), etc.) or online via an application store (e.g., a Play Store™, etc.). In the case of online distribution, at least one part of the computer program product may be at least temporarily stored in a server of a manufacturing company, a server of an application store, or a storage medium such as a memory of a relay server, or may be generated provisionally.

With regard to the elements (e.g., a module or a program) described in the one or more embodiments, each of the elements may be configured with one component or a plurality of components, and some of sub elements among the aforementioned sub elements may be omitted, or other sub elements may be further added to the embodiments. As a replacement or addition, some of the elements (e.g., a module or a program) may be integrated as one element and the integrated element may perform the functions performed by each of the elements before integration. The operations performed by a module, a program or other elements in the example embodiments may be executed sequentially, in parallel, repeatedly, or heuristically, or at least some of the operations may be executed in a different order or may be omitted, or another operation may be further added.

While the disclosure has been shown and described with reference to various embodiments thereof, it will be understood by those skilled in the art that various changes in form and details may be made therein without departing from the spirit and scope of the inventive concept, as defined by the appended claims and equivalents.

What is claimed is:

1. A control method of an electronic device for performing joint transmission, the method comprising:
    searching for access points (APs) to retrieve a plurality of APs;
    determining a modulation and coding scheme (MCS) for data transmission based on a signal strength of at least two APs among the plurality of APs;
    determining the at least two APs as candidate APs for joint transmission by comparing a joint transmission gain time according to the determined MCS and a synchronization time for the at least two APs to perform joint transmission;
    transmitting information about the candidate APs to an AP control device; and
    performing data communication with joint APs, which are determined to perform joint transmission by the AP control device, among the candidate APs.

2. The method as claimed in claim 1, wherein the determining of the at least two APs as candidate APs further comprises:
    determining APs to which the electronic device is accessible among the plurality of APs; and
    determining the at least two APs as the candidate APs based on a signal strength among the APs to which the electronic device is accessible.

3. The method as claimed in claim 2, wherein the determining of the at least two APs as candidate APs further comprises:
    obtaining a time at which data is received from the at least two APs; and
    identifying the synchronization time for the at least two APs based on a difference in time at which the data is received.

4. The method as claimed in claim 3, wherein the determining of the at least two APs as candidate APs further comprises:
    determining the MCS based on a signal strength of the at least two APs;
    calculating a first data reception time at which a predetermined size of data is received based on the determined MCS;
    calculating the joint transmission gain time by calculating a difference between the first data reception time and a second data reception time at which the predetermined size of data is received from an AP having a strongest signal strength; and
    in response to the joint transmission gain time being greater than the synchronization time, determining the at least two APs as the candidate APs.

5. The method as claimed in claim 4, further comprising:
    in response to the at least two APs being determined as the candidate APs, adding the at least two APs and a new AP;
    determining a new MCS for data transmission based on a signal strength of the at least two APs and the new AP; and
    determining the at least two APs and the new AP as candidate APs for joint transmission by comparing a joint transmission gain time and a synchronization time for the at least two APs and the new AP to perform joint transmission based on the new MCS.

6. The method as claimed in claim 1, wherein the information about the candidate APs includes identification information related to at least one candidate AP set, synchronization time information of the at least one candidate AP set, and MCS information corresponding to the at least one candidate AP set.

7. The method as claimed in claim 6, wherein one of the at least one candidate AP set is determined as a joint AP by the AP control device based on a network situation.

8. The method as claimed in claim 7,
    wherein the network situation comprises a number of external electronic devices accessed to a candidate AP, and
    wherein the AP control device determines the joint APs by excluding APs in rooms in which a guest stays and APs which are accessed to a plurality of other electronic devices from the joint APs.

9. The method as claimed in claim 1, wherein the performing of the data communication comprises:
    receiving a request to send (RTS) packet including address information related to the joint APs and a duration calculated using an MCS corresponding to the joint APs from the joint APs; and
    in response to receiving the RTS packet, transmitting a clear to send (CTS) packet including a duration calculated using an MCS corresponding to a reception signal strength of the RTS packet to the joint APs.

10. The method as claimed in claim 9, wherein the RTS packet is transmitted from the joint APs simultaneously based on the synchronization time.

11. An electronic device which performs data communication with a plurality of access point (APs) through joint transmission, the electronic device comprising:
    a communication interface;

a processor configured to control the electronic device and be electrically connected with the communication interface; and a memory configured to store instructions that, when executed by the processor, cause the processor to:
search for APs to retrieve a plurality of APs,
determine a modulation and coding scheme (MCS) for data transmission based on a signal strength of at least two APs among the plurality of APs,
determine the at least two APs as candidate APs for joint transmission by comparing a joint transmission gain time according to the determined MCS and a synchronization time for the at least two APs to perform joint transmission,
control the communication interface to transmit information about the candidate APs to an AP control device, and
control the communication interface to perform data communication with joint APs, which are determined to perform joint transmission by the AP control device, among the candidate APs.

12. The electronic device as claimed in claim 11, wherein the processor is further configured to:
determine APs to which the electronic device is accessible among the plurality of APs, and
determine the at least two APs as the candidate APs based on a signal strength among the APs to which the electronic device is accessible.

13. The electronic device as claimed in claim 12, wherein the processor is further configured to:
obtain a time at which the at least two APs receive data, and
identify the synchronization time for the at least two APs based on a difference in time at which the data is received.

14. The electronic device as claimed in claim 13, wherein the processor is further configured to:
determine an MCS based on a signal strength of the at least two APs,
calculate a first data reception time at which a predetermined size of data is received based on the determined MCS,
calculate the joint transmission gain time by calculating a difference between the first data reception time and a second data reception time at which the predetermined size of data is received from an AP having a strongest signal strength, and in response to the joint transmission gain time being greater than the synchronization time, determine the at least two APs as the candidate APs.

15. The electronic device as claimed in claim 14, wherein the processor is further configured to:
in response to the at least two APs being determined as the candidate APs, add the at least two APs and a new AP,
determine a new MCS for data transmission based on a signal strength of the at least two APs and the new AP, and
determine the at least two APs and the new AP as candidate APs for joint transmission by comparing a joint transmission gain time and a synchronization time for the at least two APs and the new AP to perform joint transmission based on the new MCS.

16. The electronic device as claimed in claim 11, wherein the information about the candidate APs includes identification information related to at least one candidate AP set, synchronization time information of the at least one candidate AP set, and MCS information corresponding to the at least one candidate AP set.

17. The electronic device as claimed in claim 16, wherein one of the at least one candidate AP set is determined as a joint AP by the AP control device based on a network situation.

18. The electronic device of claim 17,
wherein the network situation comprises a number of external electronic devices accessed to a candidate AP, and
wherein the AP control device determines the joint APs by excluding APs in rooms in which a guest stays and APs which are accessed to a plurality of other electronic devices from the joint APs.

19. The electronic device as claimed in claim 11, wherein the processor is further configured to:
control the communication interface to receive a request to send (RTS) packet including address information related to the joint APs and a duration calculated using an MCS corresponding to the joint APs from the joint APs, and
in response to receiving the RTS packet, control the communication interface to transmit a clear to send (CTS) packet including a duration calculated using an MCS corresponding to a reception signal strength of the RTS packet to the joint APs.

20. The electronic device as claimed in claim 19, wherein the RTS packet is transmitted from the joint APs simultaneously based on the synchronization time.

* * * * *